(12) United States Patent
Chang

(10) Patent No.: US 7,084,606 B2
(45) Date of Patent: Aug. 1, 2006

(54) NON-POLARITY CHARGING DEVICE

(75) Inventor: I-Chang Chang, Taipei (TW)

(73) Assignee: Iwei Technology Co., Ltd., Taipei (TW)

( * ) Notice: Subject to any disclaimer, the term of this patent is extended or adjusted under 35 U.S.C. 154(b) by 72 days.

(21) Appl. No.: 10/442,240

(22) Filed: May 21, 2003

(65) Prior Publication Data
US 2006/0055368 A1 Mar. 16, 2006

(51) Int. Cl.
H02J 7/00 (2006.01)

(52) U.S. Cl. ..................... 320/105; 320/104

(58) Field of Classification Search .......... 320/105, 320/104, 107, 109, 165, DIG. 15; 439/500, 439/504; 324/429
See application file for complete search history.

(56) References Cited

U.S. PATENT DOCUMENTS
6,147,471 A * 11/2000 Hunter .................. 320/105

* cited by examiner

Primary Examiner—Lawrence Luk

(57) ABSTRACT

The invention herein relates to a non-polarity charging device wherein the positive/negative sensing terminals are connected to the battery. When in correct polarity, current flows from positive output clamp output to the battery positive terminal and back to the charging device through the negative output clamp, otherwise, the positive voltage flows through the negative output clamp to the battery positive terminal. Also, even when the battery voltage is below the sensor reading threshold, the manual switch at both battery terminals force-feed electric current through the correct polarity conducting circuit, with positive voltage at the positive clamp output, supplying positive current to effect a complete charging circuit. When the polarity sensing is completed and charging begins, a current indicator circuit lights up to reflect that the charging device is functioning.

6 Claims, 4 Drawing Sheets

NON-POLARITY CHARGING DEVICE

BACKGROUND OF THE INVENTION

1) Field of the Invention

The invention herein relates to a non-polarity charging device wherein a positive sensor terminal and a negative sensor terminal are connected to a battery.

2) Description of the Prior Art

Referring to FIG. 1 where a conventional power source or charging device (1), due to its singular polarity circuit, cannot exchange the positive and negative output clamps (11) (12). When the positive and negative output clamps (11) (12) are incorrectly connected or come into an accidental contact; the battery (2) short circuit causes sparkling and conducting rods to melt down or even an explosion.

What is further, conventional positive/negative output clamps (11) (12) are not equipped with positive/negative sensor circuit breaker protections, so that when positive/negative clamps (11) (12) are released from the positive/negative conducting rods (21) (22), the positive/negative clamps are not cut off from the power source instantly, causing fear from the user.

It is thus the goal of the present invention to provide a charging device with no polarity preference, exchangeable terminal clamps, compact in size and is easy to carry.

SUMMARY OF THE INVENTION

The objective of the invention is to provide a non-polarity charging device wherein a positive sensor terminal and a negative sensor terminal are applied to a battery, when both the positive sensor terminal and the negative sensor terminal are applied to the battery terminals of correct polarity, the electric current will flow through a positive output clamp to the positive battery terminal and back to the charging device through a negative output clamp.

If the connections are made to the terminals of incorrect polarity then the positive voltage will flow through the negative output clamp to the positive battery terminal while the negative voltage will flow through the positive output clamp to the negative battery terminal to complete the electric circuit.

In addition, said charging device force-feed electric current passing through the correct polarity conducting circuit by means of a manual switch at two terminals of the circuit; where the positive output clamp is connected to the positive voltage, starting positive current supply, allowing the manual switch to enact the charging process even if the battery voltage is below the sensor reading threshold, enhancing the flexibility for user.

Also, when the charging device completes the polarity sensing process and start charging, the electric current indicator circuit reflects that the charging device is functioning.

BRIEF DESCRIPTION OF THE DRAWINGS

To enable a further understanding of the said objectives and the technological methods of the invention herein, the brief description of the drawings below is followed by the detailed description of the preferred embodiments.

DETAILED DESCRIPTION OF THE PREFERRED EMBODIMENT

Figure 3:
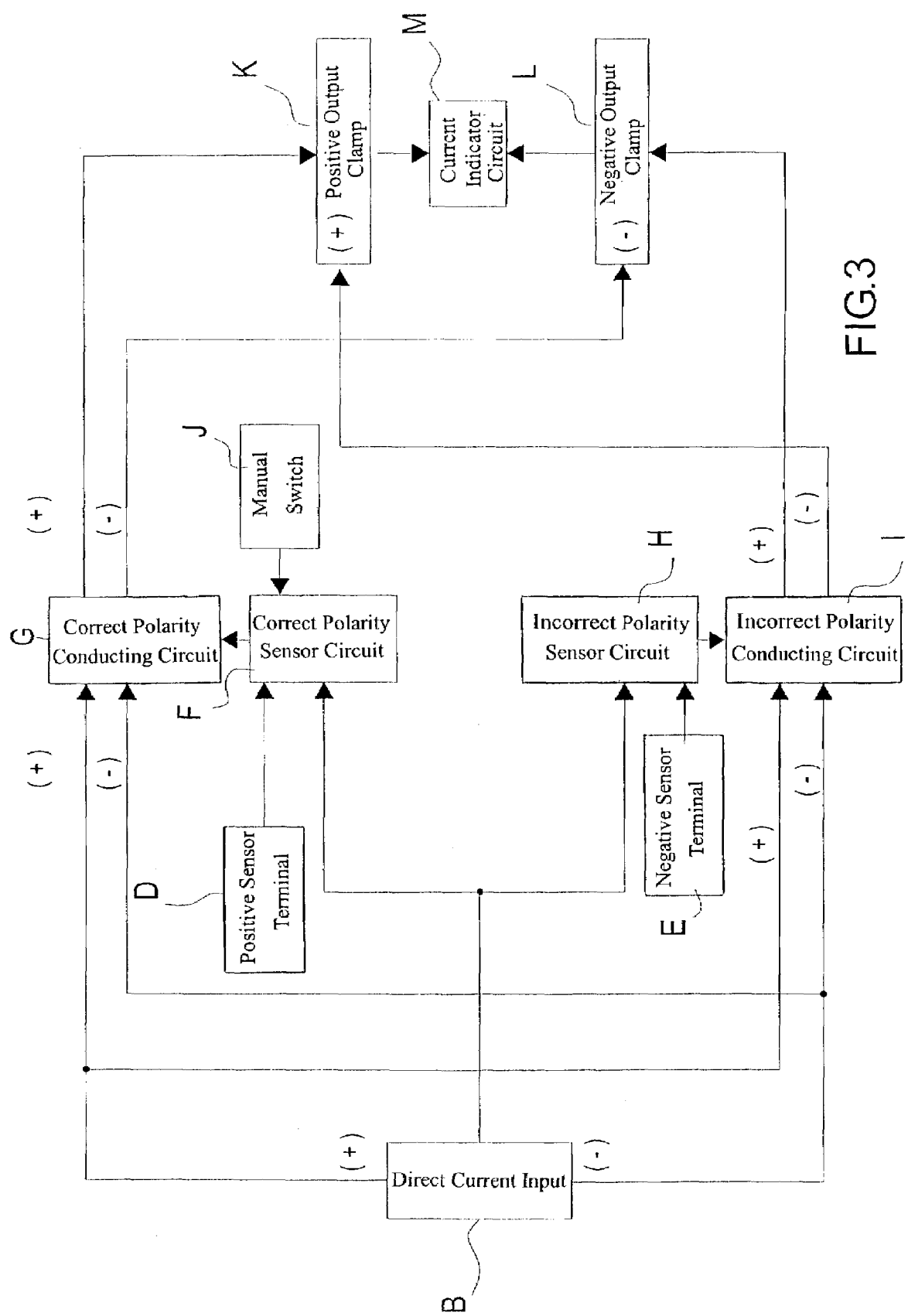
FIG. 3 is a function block diagram of a non-polarity charging device.

The invention herein relates to a non-polarity charging device, as shown in the function block diagram shown in FIG. 3, comprises: a direct current input terminal (B), a positive sensor terminal (D), a negative terminal (E), a correct polarity sensor circuit (F), a correct polarity conducting circuit (G), a incorrect polarity sensor circuit (H), a incorrect polarity conducting circuit (I), a manual switch (J), a positive output clamp (K), a negative output clamp (L), and a current indicator circuit (M), where the positive sensor terminal (D) and the negative sensor terminal (E) are connected to a battery, if the connection is made with correct polarity, meaning the positive sensor terminal (D) leads to the battery positive terminal while a negative terminal (E) leads to the battery negative terminal, the correct polarity sensor circuit (F) detects the correct polarity, drives the correct polarity conducting circuit (G) to allow the electric current flowing out from the correct polarity conducting circuit (G), through the positive clamp output (K) to the battery positive terminal, then back to the charging device through the negative output clamp (L), completing the charging circuit.

When the connection was made with the incorrect polarity, meaning the positive sensor terminal (D) leads to the negative battery terminal while a negative sensor terminal (E) leads to the positive battery terminal, the incorrect polarity sensor circuit (H) detect the incorrect polarity, drives the incorrect polarity conducting circuit (I) to allow the electric current flowing out from the incorrect polarity conducting circuit (I), through the negative output clamp (L) to the battery positive terminal, then back to the charging device through the positive output clamp (K), completing the charging circuit.

The charging device is fitted with the manual switch (J) at the correct polarity conducting circuit (G), with positive voltage connected to the positive output clamp (K), so that even when the battery voltage is beneath the sensor reading, the battery can be force-charged by supplying positive power source at the positive power source at positive output clamp (K) via the manual switch (J), enhancing the flexibility of said invention.

Figure 4:
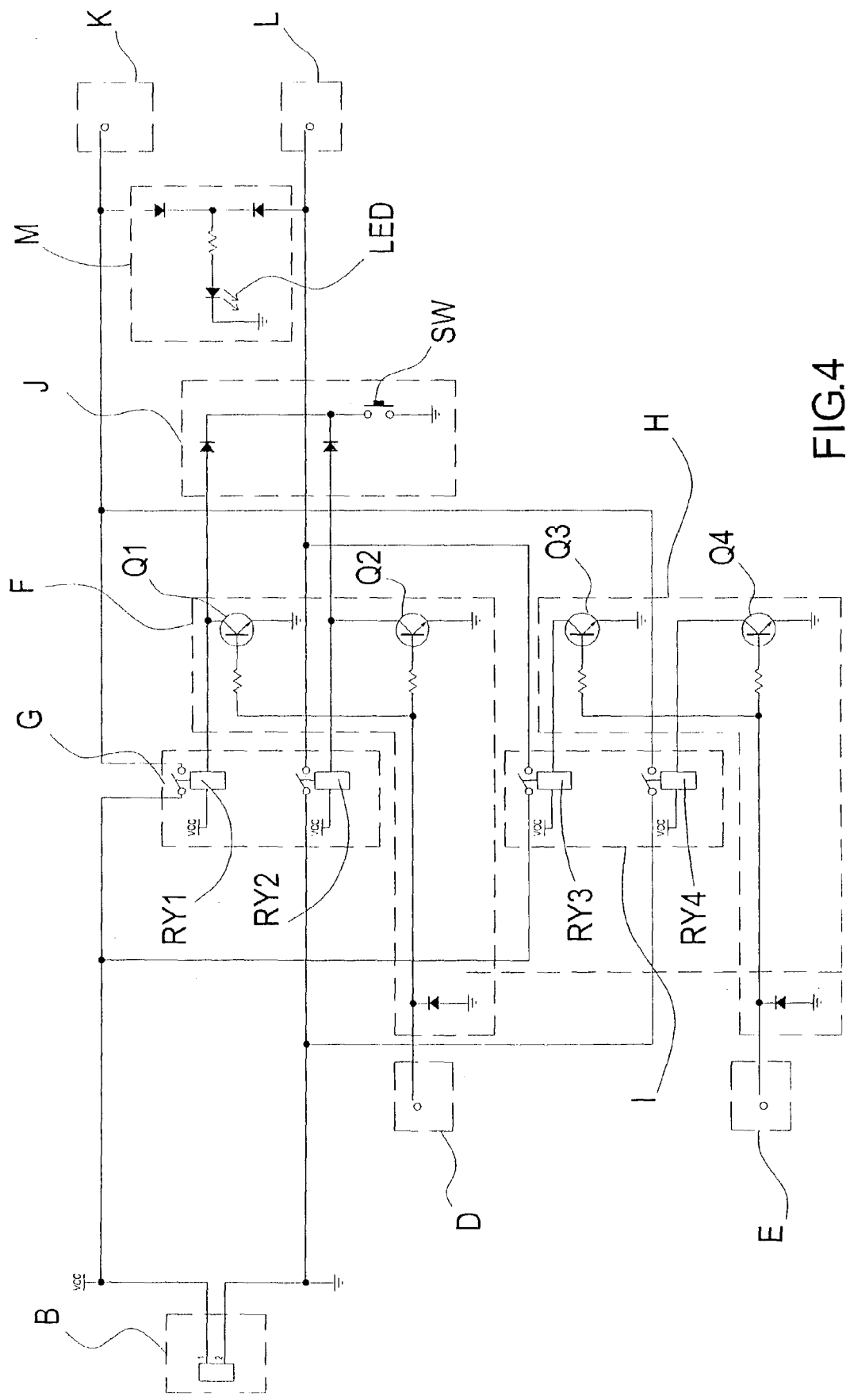
FIG. 4 is a circuit diagram of a non-polarity charging device.

Referring to FIGS. 3 and 4, when the positive sensor terminal (D) connects to the positive battery terminal and the negative sensor terminal (E) connects to the negative battery terminal, current flows from the positive sensor terminal (D) and there is no current flowing into the negative sensor terminal (E), the incorrect polarity sensor circuit (H) can not function and the electric current flows into the transistors (Q1) and (Q2), conducting the internal positive and negative terminals of the transistors (Q1), (Q2); completing the circuit and magnetically inducting the electric relays (RY1), (RY2), closes the contact point to feed current through the direct current input terminal (B) and the contact point of electric relay (RY1) to the positive output clamp (K) into the positive terminal of battery. The current then flows through the negative output clamp (L) back to the charging device, then through the contact point of electric relay (RY2) back to the direct current input terminal (B), forming a complete electric circuit.

On the other hand, when the positive sensor terminal (D) connects to the battery negative terminal and the negative sensor terminal (E) connects to the battery positive terminal: current flows into the battery through the negative sensor terminal (E) and there is no current flowing into the positive sensor terminal (D), the correct polarity sensor circuit (F) can not function and the electric current flows into the transistors (Q3) and (Q4), conducting the internal positive and negative terminals of the transistors (Q3), (Q4); completing the circuit and magnetically inducting the electric relays (RY3), (RY4), closes the contact point to feed current through the direct current input terminal (B) and the contact point of electric relay (RY3) to the negative output clamp (L) into the positive terminal of battery. The current then flows through the positive output clamp (K) back to the charging device, then through the contact point of electric relay (RY4) back to the direct current input terminal (B), forming a complete electric circuit.

Upon completing polarity sensing, the charging device effects charging while the current indicator circuit (M), connected between the positive clamp output (K) and the negative output clamp (L), turns on the light emitting diode (LED) indicating that the device is in the state of charging. The current indicator circuit (M) can be devised with a light emitting diode (LED), voice device, liquid crystal indicator, electric meter or any relative motion, static, sound, light, voice or text signaling device.

When the battery is at a low voltage or the voltage is beneath the sensor reading threshold, the manual switch (SW) can be applied to force the electric relays (RY1), (RY2) to form a complete circuit with the grounding terminal; enabling the electric relays (RY1) (RY2) to close the contact points through magnetic induction. The current from direct current input terminal (B), flows through the contact point of electric relay (RY1) and positive clamp output (K), then to the battery positive terminal, back to the charging device through the negative clamp output (L), then through the contact point of electric relay (RY2) back to the direct current input terminal (B), forming a complete circuit.

If the positive clamp (11) and the negative clamp (12) are to contact accidentally or to be removed from the battery, neither the positive sensor terminal (D) nor the negative sensor terminal (E) has any inducted current flowing through, resulting the correct polarity sensor circuit (F) and the incorrect polarity sensor circuit (H) unable to react, consequently, the electric relays (RY1), (RY2) of correct polarity sensor circuit (G) and the electric relays (RY3), (RY4) of incorrect polarity sensor circuit (I) are not magnetically inducted, the contact points break off; current from the direct current input (B) is not able to reach the positive clamp output (K) and the negative clamp output (L), effecting an automatic circuit interrupter for short circuiting protection.

The control units of said correct polarity sensor circuit (F), incorrect polarity sensor circuit (H) and delay circuit (G) can be substituted, as requested by the manufacturer, with transistor, silicon control rectifier, operational amplifier, comparer or other related electronic circuit control elements and serving the same function after the substitution.

The control units of said correct polarity conducting circuit (G) and incorrect polarity conducting circuit (I) can be substituted with electric relay, SCR or related electronic conducting elements and serving the same function after the substitution.

Figure 1:
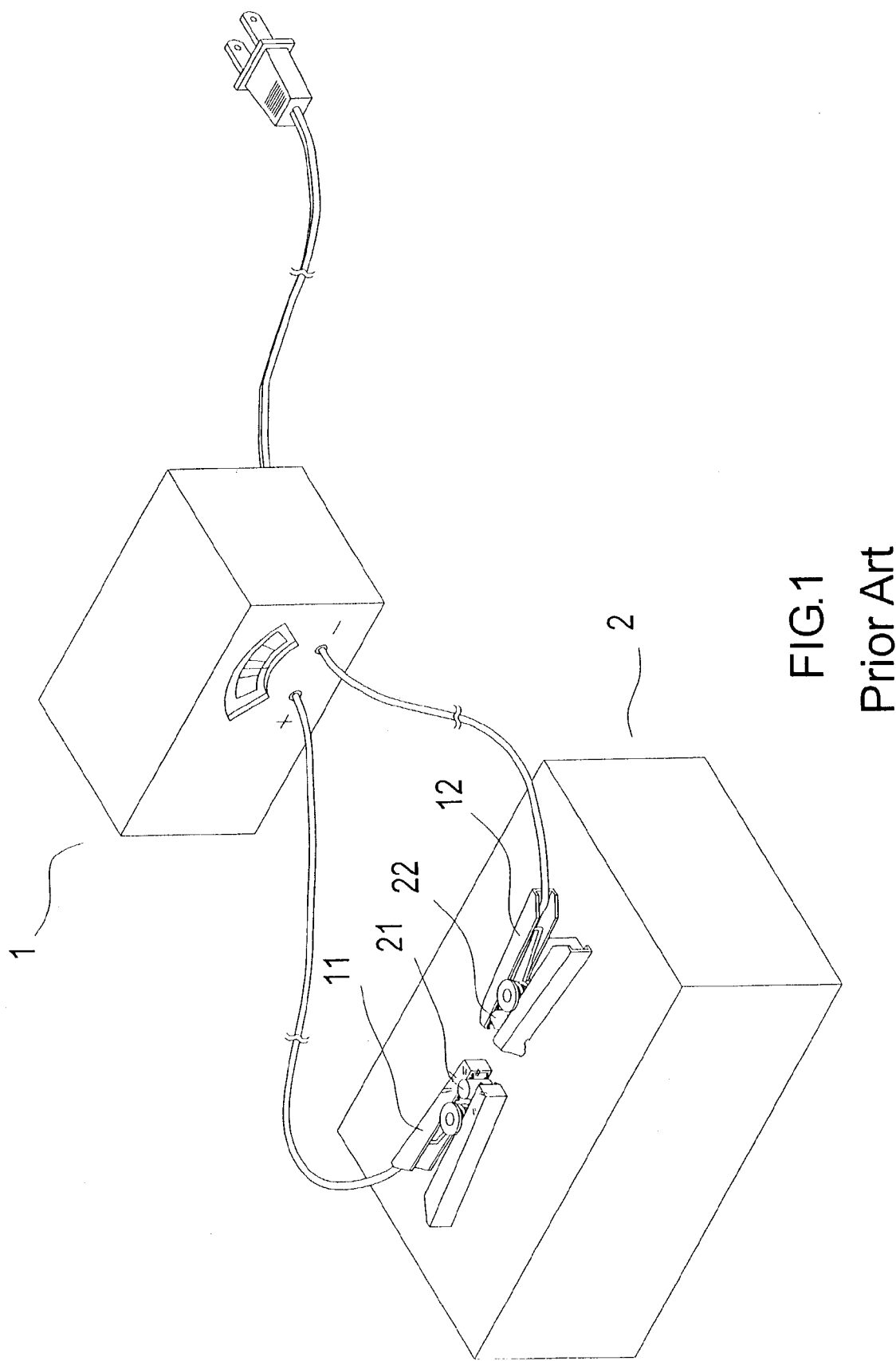
FIG. 1 is a perspective view showing the embodiment of a conventional non-polarity charging device.
Figure 2:
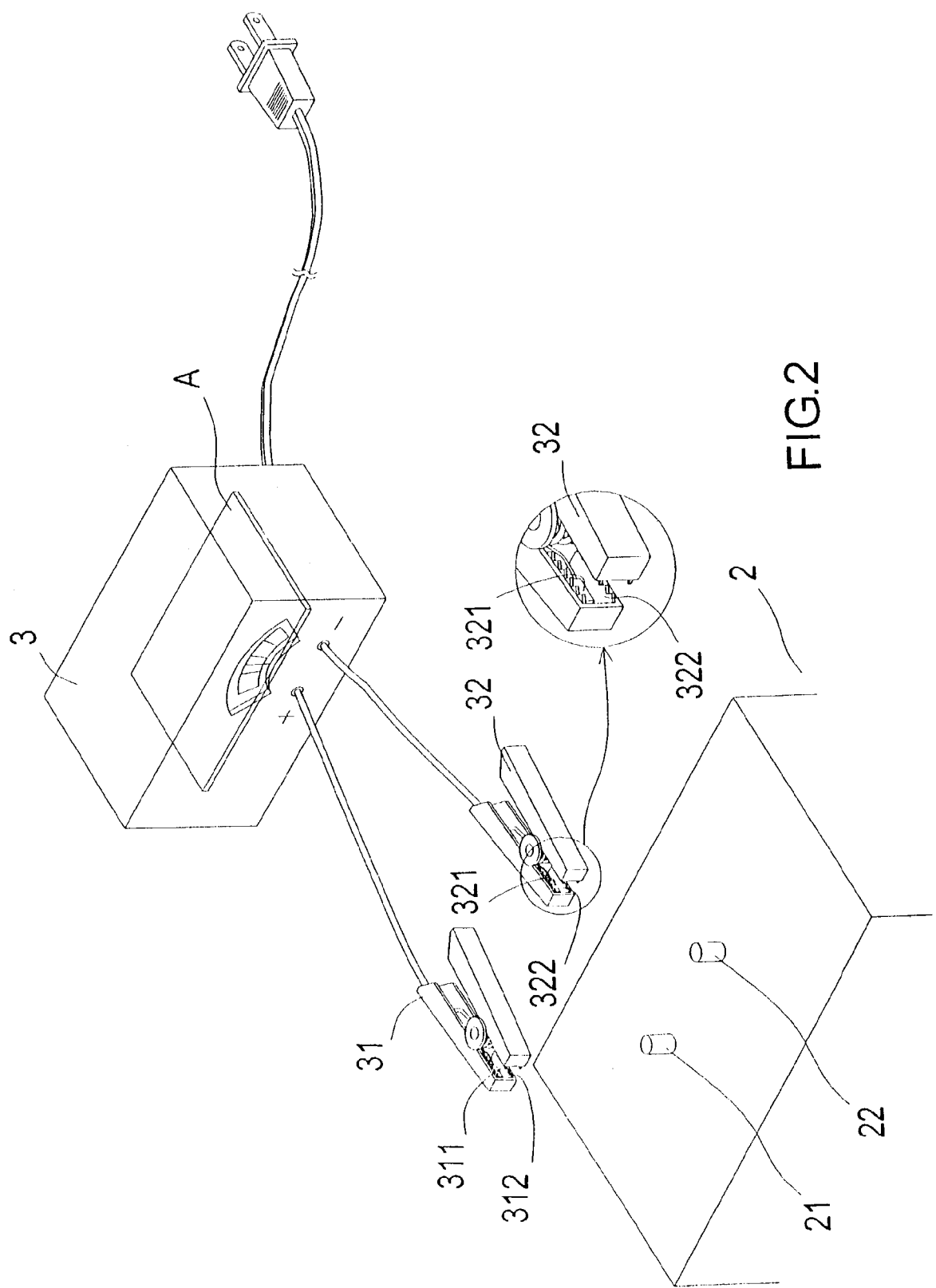
FIG. 2 is a perspective view showing the embodiment of a non-polarity charging device with the close-up illustrations of the positive/negative sensor clamps structure.

To summarize: the present invention of non-polarity charging device (3), as shown in FIG. 2, comprises: a circuit board A, a positive and a negative sensor clamps (31), (32) and conducting plates (311), (321); wherein the charging device (3) having the circuit board (A) wherefrom extended the positive and negative sensor clamps (31), (32), separately fitted with frontal conductors (312), (322), each with a corresponding conducting plate (311) or (321) connected to the circuit board (11) so that when the positive/negative sensor clamps (31), (32) open up, the conducting plates (311), (321) cut off the power source to the positive/negative sensor clamps (31), (32), enhancing the safety measure for the user.

To emphasize the progressiveness and practicality of said invention, a comparison with the conventional product was made as follow:

(Advantages of the Present Invention):
1. It is convenient and practical to have interchangeable positive/negative clamps.
2. If and when the conducting plate senses the positive/negative clamps are removed from the battery, it cuts off the power source to positive/negative clamps, providing a safety measure.
3. The automatic polarity exchange is technically advanced.
4. When the battery voltage is beneath the sensor reading, the manual switch forces conducting and effects charging; it is highly practical.
5. When the positive and negative clamps accidentally come into contact, short-circuiting is prevented.
6. It has high utilitarian value in the industry and the commercial market.

It is to be understood that the embodiment described herein is merely illustrative of the principles of the invention and that a wide variety of modifications thereto may be effected by persons skilled in the art without departing from the spirit and scope of the invention as set forth in the following claims.

The invention claimed is:

1. A non-polarity charging device comprises: a direct current input terminal, a positive sensor terminal, a negative sensor terminal, a correct polarity sensor circuit, a correct polarity conducting circuit, an incorrect polarity sensor circuit, an incorrect polarity conducting circuit, a manual switch, a positive clamp output, a negative clamp output and a current indicator circuit; where the positive sensor terminal, negative sensor terminal are to connect to a battery, if and when the connections are made with the correct polarity, meaning the positive sensor terminal leads to the battery positive terminal and the negative sensor terminal leads to the battery negative terminal, the correct polarity sensing circuit detects the correct polarity of the circuit then turns on the correct polarity conducting circuit, whereby sending the current through the positive clamp output to the battery positive terminal, then back to the charging device through the negative clamp output, forming a complete circuit; if and when the connections are made with the incorrect polarity, meaning the positive sensor terminal leads to the negative battery terminal and the negative sensor terminal leads to the positive battery terminal, the incorrect polarity sensing circuit detects the incorrect polarity of the circuit then turns on the incorrect polarity conducting circuit, whereby sending the current through the negative clamp output to the battery positive terminal, then back to the charging device through the positive clamp output, forming a complete circuit; also, as the charging device completes the polarity sensing and enters the charging state, the current indicator circuit, connected between the positive clamp output and the negative output clamp, start to indicate that the charging device is functioning.

2. The non-polarity charging device of claim 1, wherein the manual switch at the two battery terminals to force conduct current so that the voltage through the correct polarity conducting circuit to the positive clamp output is positive, then flow back to the charging device through the negative clamp output to complete the circuit for the charging process.

3. The non-polarity charging device of claim 1, wherein the positive clamp output and negative clamp output while in accidental contact or when being removed from the battery neither the positive sensing terminal nor the negative sensing terminal has any inducted current flowing through, causing either the correct polarity sensing circuit or the incorrect sensing circuit unable to react, results in the internal circuitry of either the correct polarity conducting circuit or the incorrect conducting circuit unable to respond, the current from the direct current input unable to flow to the positive clamp output or the negative output clamp, forming an automatic interrupter for protection against short-circuiting.

4. The non-polarity charging device of claim 1, wherein the control unit of the correct polarity sensing circuit, and incorrect polarity sensing circuit can be transistor, silicon control rectifier, operational amplifier, comparator or related electronic circuit control element.

5. The non-polarity charging device of claim 1, wherein the current indicator can be light emitting diode, voice device, liquid crystal display, electric meter or relative motion, static, sound/light, voice, text signaling device.

6. The non-polarity charging device of claim 1, wherein the control unit of the correct polarity conducting circuit or incorrect polarity conducting circuit can be electric relay, SCR or the conducting element of related electronic circuit.

* * * * *